(12) United States Patent
Hojjatie et al.

(10) Patent No.: US 9,988,270 B2
(45) Date of Patent: Jun. 5, 2018

(54) OXIDATION PROCESS FOR PRODUCING POTASSIUM THIOSULFATE

(71) Applicant: Tessenderlo Kerley, Inc., Phoenix, AZ (US)

(72) Inventors: Michael Massoud Hojjatie, Tucson, AZ (US); Constance Lynn Frank Lockhart, Tucson, AZ (US); Alexandros Dimitriadis, Chandler, AZ (US); Mark P. Clarkson, Gilbert, AZ (US); Harry Charles Kominski, Phoenix, AZ (US); Jeroen Van Cauwenbergh, Baardegem (BE); Nicholas S. Shult, Maricopa, AZ (US); Adam T. Goldsmith, Chandler, AZ (US)

(73) Assignee: Tessenderlo Kerley, Inc., Phoenix, AZ (US)

(*) Notice: Subject to any disclaimer, the term of this patent is extended or adjusted under 35 U.S.C. 154(b) by 0 days. days.

(21) Appl. No.: 15/380,838

(22) Filed: Dec. 15, 2016

(65) Prior Publication Data

US 2017/0190576 A1 Jul. 6, 2017

Related U.S. Application Data

(60) Provisional application No. 62/273,385, filed on Dec. 30, 2015.

(51) Int. Cl.
*C01B 17/64* (2006.01)
*C05D 1/00* (2006.01)
*C05G 3/00* (2006.01)

(52) U.S. Cl.
CPC ............... *C01B 17/64* (2013.01); *C05D 1/00* (2013.01); *C05G 3/0064* (2013.01)

(58) Field of Classification Search
CPC .......... C01B 17/64; C05G 3/0064; C05D 1/00
See application file for complete search history.

(56) References Cited

U.S. PATENT DOCUMENTS 5,656,673 A * 8/1997 Wilhelm ............... A01N 59/02
504/362
2012/0031158 A1* 2/2012 Hojjatie ................ C01B 17/64
71/63

FOREIGN PATENT DOCUMENTS

RU 2 167 101 C2 5/2001
WO 2015/157498 A1 10/2015

OTHER PUBLICATIONS

Anonymous, "Thiosulfate", "ROMPP Online", Mar. 1, 2002 (Mar. 1, 2002), Georg Thieme, Verlag KG, XP055290255, "Herstellung".
Herman V. Tartar, "On the Reaction Between Sulfur and Potassium Hydroxide in Aqueous Solution", Journal of the American Chemical Society, vol. 35, No. 11, Nov. 1, 1913 (Nov. 1, 1913), [pp. 1741-1747, XP055290113, US ISSN: 0002-7863, DOI: 10.1021/ja02200a006, "Experimental"; p. 1744-p. 1745.
European search report dated Jul. 28, 2016 of European Patent Office in corresponding EPO Patent App. No. 16156262.4-1375.
International Search Report dated Mar. 9, 2017 in International Application No. PCT/US16/67336.
Written Opinion of the International Searching Authority dated Mar. 9, 2017 in International Application No. PCT/US16/67336.
Tartar, "On the Reaction Between Sulfur and Potassium Hydroxide in Aqueous Solution", Journal of the American chemical Society, Nov. 1913, vol. 35, pp. 1741-1747.
Sorokin et al., "*Dethiobacter alkaliphilus* gen. nov. sp. nov., and *Desulfurivibrio alkaliphilus* gen. nov. sp. nov.: two novel representatives of reductive sulfur cycle from soda lakes", Extremophiles, Mar. 4, 2008 (Mar. 4, 2008), vol. 12, pp. 431-439.
Vesselovsky et al., "Action of Alkali Hydroxides on Elementary Sulfur and Mercaptans Dissolved in Naphtha", Industrial and Engineering Chemistry, Feb. 1931, vol. 23, p. 181-184.

* cited by examiner

*Primary Examiner* — Timothy C Vanoy
(74) *Attorney, Agent, or Firm* — Fennemore Craig, P.C.

(57) ABSTRACT

An efficient process for preparation of potassium thiosulfate ($K_2S_2O_3$) is described. Potassium hydroxide (KOH) and elemental sulfur (S) are converted to potassium polysulfide, which is subsequently oxidized. The process allows using specifically designed process conditions such as mole ratios of potassium hydroxide to sulfur, and temperature, to obtain an optimized formulation of desired polysulfide, and a specifically designed set of conditions such as temperature, pressure, rate and duration of the oxidant during the oxidation conditions, to obtain a relatively high concentration of soluble potassium thiosulfate product with high purity, with relatively low amounts of byproducts. The manufacturing process can either be a batch process or a continuous process utilizing Continuous Stirred Tank Reactors (CSTR). The CSTR process is dependent on several design parameters, including pressure, and temperature optimization to avoid product instability. The resulting potassium thiosulfate is a beneficial fertilizer with high potassium content as a 50% liquid source of potassium.

20 Claims, 8 Drawing Sheets

OXIDATION PROCESS FOR PRODUCING POTASSIUM THIOSULFATE

CROSS-REFERENCE TO RELATED APPLICATIONS

This application claims priority to U.S. provisional application No. 62/273,385 filed on Dec. 30, 2016, which is hereby incorporated herein by reference for all that it discloses.

FIELD OF THE INVENTION

The present invention is directed to the production of potassium thiosulfate solution. The potassium thiosulfate solution has many uses, including as liquid fertilizer.

BACKGROUND OF THE INVENTION

The thiosulfate ion, $S_2O_3^{2-}$, is a structural analogue of the $SO_4^{2-}$ ion in which one oxygen atom is replaced by one S atom. However, the two sulfur atoms in $S_2O_3^{-2}$ are not equivalent. One of the S atoms is a sulfide-like sulfur atom that gives the thiosulfate its reducing properties and complex-forming abilities.

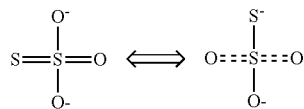

Thiosulfates are used in leather tanning, paper and textile manufacturing, flue-gas desulfurization, cement additives, dechlorination, ozone and hydrogen peroxide quenching, coating stabilizers, as an agricultural fertilizer, as a leaching agent in mining, and so on.

Due to these complex-forming abilities with metals, thiosulfate compounds have also been used in commercial applications such as photography, waste treatment and water treatment applications.

Thiosulfates readily oxidize to dithionates, trithionates, tetrathionates, and finally to sulfates:

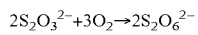

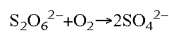

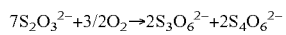

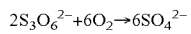

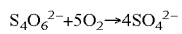

Due to this transformation, thiosulfates are used as fertilizers in combination with cations such as ammonium, potassium, magnesium and calcium. The ammonium, alkali metal and alkaline earth thiosulfates are soluble in water. Water solubility of thiosulfates decrease from ammonium to alkali metals to alkaline earth thiosulfates.

Potassium (K) is a primary plant nutrient. Potassium is associated with movement of water, nutrients, and carbohydrates in plant tissue. If potassium is deficient or not supplied in adequate amounts, growth is stunted and yields are reduced. Potassium stimulates early growth, increases protein production, improves the efficiency of water use, is vital for stand persistence in cold weather, and improves resistance to disease and insects.

Potassium thiosulfate fertilizer contains the highest percentage of potassium in liquid form, compared to other sources of potassium such as potassium chloride (KCl), potassium nitrate ($KNO_3$), and potassium sulfate ($K_2SO_4$). In addition, it combines potassium with sulfur (17%) which is also an essential plant nutrient.

It is contemplated that potassium thiosulfate could be produced by several alternative routes such as:

I. Reaction of S and $SO_3^{2-}$ in neutral or alkaline medium
II. Reaction of $S^{2-}$ and $SO_3^{-2}$ (via $SO_2$ and $HSO_3^{2-}$)
III. Oxidation of Potassium Hydrosulfide (KSH)
IV. Ion Exchange reaction between alkaline thiosulfates and potassium chloride or nitrate
V. Salt exchange between alkaline thiosulfates and Potassium Chloride or Nitrate
VI. Oxidation of Potassium Polysulfide However, some of these alternatives present serious difficulties or disadvantages. Route I and II are relatively long processes and require the use of sulfur dioxide $SO_2$. Both these routes are described when the scrubbing of the air pollutant sulfur dioxide is an objective. Route III requires handling of potassium hydrosulfide as a raw material which is not favorable due to a hydrogen sulfide environment. Routes IV and V suffer from the drawback that ion exchange and salt exchange require expensive raw materials and equipment, and also require a step of final stripping due to the need for working with dilute solutions. Finally, the prior art has been unsuccessful in producing high purity potassium thiosulfate with a low amount of byproducts via Route VI as thiosulfates, in general, are susceptible to further conversion to sulfite and sulfate. Potassium thiosulfate products with relatively high level of impurities are not well suitable as liquid plant nutrient or liquid fertilizer because of insufficient storage stability and the presence of particulate matter.

SUMMARY OF THE INVENTION

Surprisingly the process according to the invention solves the problems identified with Route VI in the prior art. The process according to the present invention provides for a process for the preparation of potassium thiosulfate from potassium polysulfide by oxidation allowing to produce a liquid solution of potassium thiosulfate in high concentration with relatively low amounts of solid or soluble byproducts.

Preferably, the reaction is carried out under appropriate temperature and pressure conditions, and preferably using certain mole ratios of potassium hydroxide and sulfur, and preferably using certain duration of contact with an oxidizing agent, preferably oxygen. One or more of the preferred conditions for the reaction between potassium hydroxide and sulfur allows for low contaminants, while one or more of the preferred conditions for oxidation prevent or reduce further oxidation of the product to polythionates or sulfate.

The potassium thiosulfate provided with the process according to the present invention can be provided in any form, such as in a (concentrated) solution, as solid, or as composition with other components.

Generally, the process for preparing potassium thiosulfate of the present invention comprises the following steps:

Step (1): providing a potassium hydroxide solution;
Step (2): adding sulfur to the solution;
Step (3): reacting these to form a reaction mixture comprising potassium polysulfide;

Step (4): adding an oxidizing agent, preferably oxygen, to the reaction mixture and reacting under conditions suitable to form potassium thiosulfate; and Step (5): recovering the potassium thiosulfate.

The process described herein may employ inexpensive raw materials to produce high purity potassium thiosulfate with relatively low amounts of byproducts such as for example one or more of the following byproducts: sulfites, sulfates, polythionates, carbonates, and/or bicarbonates.

DETAILED DESCRIPTION OF THE INVENTION

Figure 1:
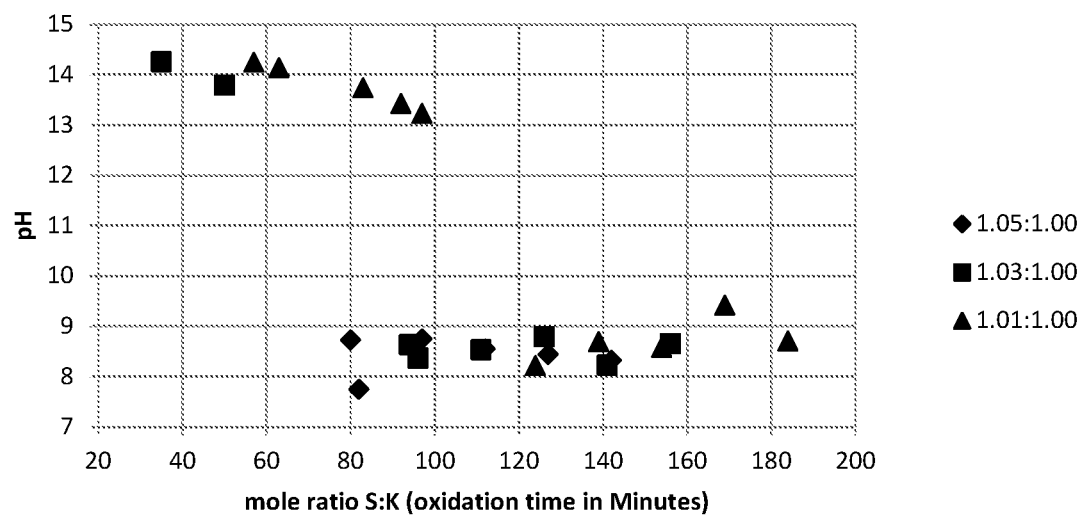
FIG. 1 is a graph titled "Oxidation of Potassium Polysulfide Mole Ratio S:K vs. pH" illustrating the change of pH of potassium polysulfide in the potassium polysulfide as it is oxidized, as indicated by change in the mole ratio of sulfur to potassium.

It is an object of the present invention to provide a method for production of potassium thiosulfate by an oxidation reaction of potassium polysulfide wherein relatively inexpensive raw materials, such as sulfur, water, and an oxidizing agent, such as for example oxygen are used, and wherein high purity potassium thiosulfate can be obtained. Potassium hydroxide is another raw material used in the method according to the invention.

It is another objective of the present invention to produce potassium thiosulfate solution in high concentration.

It has been surprisingly discovered that Route VI referred to above can be used to produce potassium thiosulfate solution in relatively pure form, in a relatively short time, using few, relatively inexpensive raw materials, and resulting in a very low amounts of byproducts compared to the other approaches known from the prior art.

It is yet another objective of this invention to produce potassium thiosulfate solution having a concentration in the range of about 40-56%, preferably about 45-56%, and even more preferably about 50-56% thiosulfate.

In a preferred embodiment, high concentration potassium thiosulfate solution is produced without need for specific concentration steps.

It is still another objective of this invention to produce potassium thiosulfate with low residual contamination from byproducts.

It is still another objective of the present invention to produce potassium thiosulfate by oxidation of potassium polysulfide wherein difficult processing steps and separation steps are avoided.

It is still another objective of the present invention to produce potassium thiosulfate with a minimal level of solid byproducts, such as potassium sulfate. The term minimal level means that the solid byproducts comprise about 0.5 wt % sulfate or lower, like preferably 0.4% by weight or lower of the potassium thiosulfate produced. Potassium thiosulfate with such low level of potassium sulfate is very well suitable as liquid fertilizer, such as for foliar application as the amount of sulfate is below the dissolution limit. Hence, in the most preferred embodiment, no solid side products are visible.

However, not all uses require having no solids, and the process according the present invention can provide potassium thiosulfate with lower than 5% solid, preferably lower than 3% solids, and even more preferred with lower than 2% solid content.

It is still another objective of the present invention to produce potassium thiosulfate with no or very low levels of polythionates, which are soluble oxidation byproducts.

It is still another objective of the present invention to produce potassium thiosulfate by a batch operation approach.

It is still another objective of the present invention to produce potassium thiosulfate by a continuous approach using a series of continuous stirred tank reactors (CSTR).

It is still another objective of the present invention to provide a method which allows production of a stable potassium thiosulfate product having close to neutral pH.

It is still another objective of the present invention to produce a stable potassium thiosulfate product with a shelf life sufficient for commercial use.

One or more of the objectives as described above are obtained with the processes as described below. Also, one or more of said objectives are obtained with the apparatus as described below.

One or more of the objectives as described above are obtained with the process according the present invention, which can be implemented both in batch and in continuous processes for the preparation of potassium thiosulfate in high concentration with relatively low amounts of soluble contaminants such as sulfite, sulfate, and polythionates. In preferred embodiments, controlling process parameters such as mole ratio of the raw materials, purity of raw materials, temperature, pressure, and/or other conditions for the oxidation step can result in a preferred clear solution with a high percentage of potassium in liquid form. In a still more preferred embodiment, introduction of the oxidizing agent can be optimized for producing high purity, high concentration potassium thiosulfate with low amounts of byproducts.

The liquid potassium thiosulfate product may have an almost neutral pH, which makes this suitable as a liquid fertilizer, as plant nutrient and especially as a foliar fertilizer. The potassium thiosulfate may be used as such, or in admixture with other compatible fertilizers or other components such as micronutrients and the like.

One or more of the objectives as described above are obtained with the processes according to the present invention for preparation of potassium thiosulfate from potassium polysulfide (KPS) by oxidation, and preferably under appropriate temperature and pressure, and using preferred mole ratios of potassium hydroxide and sulfur, and using preferred duration with an oxidizing agent, such as for example oxygen, to produce a liquid solution of potassium thiosulfate in high concentration with relatively low amounts of solid or soluble byproducts. The preferred conditions for oxidation prevent or reduce further oxidation of the product to polythionates or sulfate.

Generally, the process for preparing potassium thiosulfate of the present invention comprises the following steps:

Step (1): providing a potassium hydroxide solution;
Step (2): adding sulfur to the solution;
Step (3): reacting these to form a reaction mixture comprising potassium polysulfide;
Step (4): adding an oxidizing agent, preferably oxygen, to the reaction mixture and reacting under conditions suitable to form potassium thiosulfate; and
Step (5): recovering the potassium thiosulfate.

Oxidation of polysulfides to thiosulfates is referred to in the literature but is generally applied as a commercial method of disposal of sulfide waste rather than a method for manufacturing of thiosulfates. This oxidation is slow at ambient or near ambient temperatures and pressures, and extended oxidation will further oxidize the thiosulfate to sulfate. Thiosulfates in general are susceptible to conversion to sulfite and sulfate under adverse temperature and pressure.

The present invention utilizes the oxidation of potassium polysulfide with an oxidizing agent, such as preferably oxygen, for the preparation of a high purity and concentrated potassium thiosulfate and in a preferred embodiment, it can be used without further need for concentration by evaporation. The raw materials employed in this invention are readily available potassium hydroxide, sulfur, water, and oxygen. No or relatively low amounts of secondary byproducts are formed. Conditions are preferably optimized to avoid oxidation of the potassium thiosulfate product to potassium sulfate. The solubility of potassium sulfate in potassium thiosulfate is only about 0.5% by weight, and with less preferred conditions, the product will not be pure and thiosulfate will be lost to solids, assuming a wholly liquid product. In case solids can be handled, e.g. because the ultimate product is used with some solids, less optimized conditions may be used.

In a preferred embodiment, the process involves employing such conditions that high purity potassium thiosulfate with low amounts of dissolved byproducts, including polythionates, is produced, preferably keeping insoluble byproducts as sulfites and sulfates below their solubility limits. This potassium thiosulfate product is particularly suitable as plant nutrient, foliar spray fertilizer and the like.

The process for preparing potassium thiosulfate uses operating conditions designed to minimize high temperature oxidation of potassium thiosulfate, leading to minimal byproducts and allowing operating the process using a minimum of excess sulfur.

The present invention of potassium thiosulfate could be achieved via batch operation, and/or in a continuous set up using CSTR (Continuous Stirred Tank Reactors). The production method according to the invention can be batch-wise or continuous, depending on the required scale of operation.

In general, if it is desired to produce larger volumes, they are preferably produced in a continuous method rather than via a batch method.

There will be two main steps in the potassium thiosulfate production process: production of potassium polysulfide and oxidation of the potassium polysulfide to potassium thiosulfate. The first main step in the process is the reaction of potassium hydroxide with sulfur under preferred mole ratios of sulfur to KOH at elevated temperature, to form the desired potassium polysulfide. The second main step in the process is the oxidation step involving the reaction of an oxidizing agent, preferably oxygen, with said polysulfide under preferred conditions such as temperature and pressure, resulting in high purity and high concentration potassium thiosulfate at near neutral pH of preferably about 6.5-8. The resulting potassium thiosulfate product with a preferred concentration of about 50-56% is stable for 6 months or more under normal storage conditions, preferably about one year or more.

Production of sulfide and thiosulfate is shown in the following chemical equations:

$$6KOH+4S \rightarrow 2K_2S+K_2S_2O_3+3H_2O$$

The sulfide dissolves additional sulfur to form potassium polysulfide $$2K_2S+K_2S_2O_3+(x-1)S \rightarrow 2K_2S_x+K_2S_2O_3$$

Overall potassium polysulfide reaction $$6KOH+(2x+2)S \rightarrow 2K_2S_x+K_2S_2O_3+3H_2O$$

Oxidation reaction of potassium polysulfide to potassium thiosulfate $$2K_2S_x+3O_2 \rightarrow 2K_2S_2O_3(x=2)$$

Overall potassium thiosulfate reaction $$2KOH+2S+O_2 \rightarrow K_2S_2O_3+H_2O$$

There is no such method described for commercial production of potassium thiosulfate in the literature. The inventors determined preferred reaction conditions, including one or more, and preferably including a combination of at least two of the following reaction conditions: operating pressure, operating temperature, and mixing of the raw material feed at specific mole ratios. Using preferred conditions, a high purity, high concentration potassium thiosulfate product with no or very low insoluble byproduct such as sulfate and with low amounts of soluble oxidation byproducts, such as polythionates, or sulfates in amounts below the solubility limit was achieved.

Preferably, such product could be used as a concentrated source of liquid potassium and sulfur containing fertilizer, and as a foliar fertilizer with a typical fertilizer grade of 0-0-25-17S, containing up to about 25% K as $K_2O$, and up to about 17% S.

The fertilizer generally comprises about 5 wt % of solids or less, preferably about 3 wt % or less. In more preferred embodiments, the fertilizer contains 2 wt % of solids, which is below industry average. In a most preferred embodiment, the fertilizer does not contain solids, and is a clear solution.

The fertilizer comprises preferably about 1% sulfite or less, preferably about 0.01-0.5% sulfite. The fertilizer comprises preferably about 1 wt % sulfate or less, more preferably about 0.5% or less, and more preferably about 0.01-0.2% sulfate.

The pH of the fertilizer preferably is about 9 or lower, preferably within the range of about 6-8.5, and more preferably about 6.5-8. The pH generally is measured about 2 weeks after production to have the products reach a stable pH value.

Furthermore, the fertilizer preferably has a low salt out temperature of about −10 to about 17° C., and shelf life of up to one year.

The most preferred fertilizer combines these preferred features.

Hence, the process steps are preferably done at such conditions that the formation of byproducts such as sulfite, sulfate, and polythionates is minimized. In yet another embodiment of the invention, a process step or steps can be used to remove some byproducts from recycled or non-recycled feed streams.

The process according to the present invention requires several steps, each of which has preferred conditions. It will be clear for the skilled person that it is even more preferred to combine preferred conditions of one process step with preferred conditions of another process step. Equally, preferred control measures are preferably combined with other preferred embodiments.

Description of the Potassium Thiosulfate Production Process

A. Batch Operation

Step 1 to 3: Production of Potassium Polysulfide

In this process, raw materials are fed into the reactor based on the required production recipe and the raw material consumption ratios as defined by the chemical reactions. In the reactor, sulfur is added to potassium hydroxide (KOH) solution. The mixture is agitated and an exothermic reaction between sulfur and KOH takes place to produce potassium polysulfide.

Effects of purity of sulfur and KOH raw material for preparation of potassium polysulfide and final potassium thiosulfate products showed that the presence of certain impurities has an adverse effect on the quality of the potassium polysulfide and potassium thiosulfate products.

As the reaction of S and KOH is exothermic, it is preferred to allow for such rate of addition of sulfur to potassium hydroxide that the temperature of the mixture remains below about 110° C., preferably below about 100° C. A higher temperature may become detrimental to the product stability. Alternatively, the mixture may be cooled to below about 110° C., even more preferably below about 100° C. Potassium polysulfide characterization was achieved by varying sulfur to potassium (S:K) mole ratios in order to determine the effects of these materials on the potassium polysulfide, particularly the pH of the potassium polysulfide product. The pH of potassium polysulfide products with different S to K mole ratios are shown in Table 1.

TABLE 1 pH of Potassium Polysulfide Products of Varying K:S Mole Ratio

| | potassium polysulfide Mole Ratio K:S | | | |
|---|---|---|---|---|
| | 6:6 | 6:10 | 6:12 | 6:13.5 |
| pH - Day 1 | 14.88 | 13.99 | | 10.86 |
| pH - Day 4 | 14.88 | 14.08 | 11.73 | 11.33 |
| pH - Day 7 | 14.90 | 14.03 | 11.79 | |
| pH - Day 12 | 14.81 | 13.89 | 11.82 | 11.23 |
| pH - Day 20 | 14.82 | 13.72 | 11.97 | 11.21 |
| mean pH | 14.86 | 13.94 | 11.83 | 11.16 |

From this table, it appears that the pH of potassium polysulfide decreases as the amount of S increases. However, in any given potassium polysulfide sample, the pH is stable. Analyses of the above four potassium polysulfide products showed that the oxidation to thiosulfate occurs more readily in the solution of lower K:S ratios.

The effect of mole ratio of K:S on the pH of potassium thiosulfate product during the oxidation process over time when the mole ratio of S increases relative to K was also studied. The mole ratio of S to K vs. pH of potassium polysulfide is shown in FIG. 1.

The mole ratio of S to K appears to have pronounced effects during the following oxidation step.

The process of forming potassium thiosulfate is optionally, but preferably, monitored for pH 7.5 to 8.5 in a storage tank equipped with agitation and pH electrode. This allows improved quality control.

The optimal potassium polysulfide solution will contain enough S, while the amount of K corresponds to about 40-56 wt %, preferably about 48-56 wt %, even more preferably about 50-56% by weight of $K_2S_2O_3$—this is about 20.8-24.2% $K^+$ (about 25-30% $K_2O$) and about 17.7-19.9% S.

The polysulfide reaction is according to the following equation:

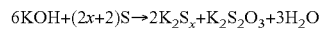

$$6KOH+(2x+2)S \rightarrow 2K_2S_x+K_2S_2O_3+3H_2O$$

The x number for the potassium polysulfide portion should be as near to 2 as possible. The equation for the oxidation of potassium polysulfide is: $K_2S_x+3/2O_2 \rightarrow K_2S_2O_3+(x-2)S$. Theoretically, if x=2 the residual sulfur will be non-existent. Potassium polysulfide does contain some potassium thiosulfate. The higher the thiosulfate concentrations in the potassium polysulfide solutions, the higher the x number for the remaining polysulfides. Finally, the lower the x number in polysulfides, the lower is the concentration of potassium thiosulfate in the solution. Preferably, each contributory factor here will be analyzed to determine what the priorities can be. Therefore it is desirable to have a potassium polysulfide solution that is optimized for thiosulfate content. Also it is desirable to evaluate potassium polysulfide products with different sulfur content for their pH. An optimized temperature of synthesis is also desirable. A concern is the stability of potassium thiosulfate at temperatures near boiling. An investigation was conducted with the objective of defining the point where potassium polysulfide synthesis should cease and oxidation should begin. It would be advantageous to conduct the potassium polysulfide synthesis in the shortest time possible. This obviously would enhance the rate of production, and would also decrease decomposition of the product that will occur at elevated temperatures over time. If potassium thiosulfate decomposes to sulfite ($K_2SO_3$), or oxidizes to sulfate ($K_2SO_4$), it cannot be recycled in the process and will be a byproduct. The objective was to define the point where potassium polysulfide concentration was maximized. Preferably, the potassium polysulfide concentration serves as a defining control parameter in this process.

Procedures were varied to optimize the potassium polysulfide concentration. In one set of experiments, mole ratios of the raw materials (which consisted of sulfur and KOH) were varied for S:$K^+$ ratio=0.99-2.25:1. In one embodiment of the invention, preferred mole ranges are S:K between about 1.0 and about 1.5, and more preferably between about 1.0 and about 1.2. Optimum mole ratio was established at about 1.05:1 for S:K ratios, which is the most preferred ratio.

Optimum reaction temperature was established by investigating the potassium polysulfide formation at temperature ranges from about 85-104° C. Suitable temperature range is between about 80 and about 110° C., preferred temperature range is between about 85—and about 102° C., and an even more preferred range is between about 88 and about 95° C. Optimum temperature was established at about 90-92° C., which is most preferred. Rate of addition of sulfur to KOH was established at such rate to keep the temperature of the exothermic reaction within the optimum temperature. Cooling was also used when necessary.

The reaction time for the formation of optimum KPS concentration was studied in several independent reactions. Each reacting solution was sampled periodically to follow the progress of potassium polysulfide concentration. Suitable reaction times vary between about 0.5 hour to about 3 hours, preferably about 0.7 hour to about 2 hours, and most preferably about 1-1.5 hours. The optimum potassium polysulfide concentration stabilizes from about 60 to about 70 minutes at about 90 to about 92° C., which reflect most preferred reaction conditions.

Generally, the sulfur is added to a solution of potassium hydroxide that may comprise potassium polysulfide.

Preferably, the KOH solution provided to the reactor has a concentration of about 30 wt % or more, and more preferably, about 40 wt % or more. Generally, the concentration will be about 70 wt % or less, more preferably, about 60 wt % or less. Most preferably, the sulfur is added slowly to a solution of about 45-55 wt %, such as about 50 wt % caustic KOH. In a preferred embodiment, the sulfur is added at such a rate to achieve a temperature of about 85° C. (about 185° F.) or higher. More preferably, temperature is kept in the range of about 85 to about 95° C. (about 185-203° F.) by appropriate cooling and heating and appropriate rate of sulfur addition. Even more preferably, temperature is kept in the range of about 90 to about 92° C. (about 195-198° F.).

The sulfur is preferably combined with the potassium hydroxide at a sulfur to potassium mole ratio of about 1.6:1 to about 0.99:1. More preferably, the mole ratio is about 1.4:1 to about 0.99:1. Still more preferably, the mole ratio is about 1.1:1 to about 1.00:1. Even more preferably, the ratio is about 1.05:1. High relative amounts of, e.g., about 1.6:1 to about 1.4:1 can be useful for improving the overall reaction kinetics. Ratios of between about 1.4:1 to about 1.2:1 can be useful for improving the overall reaction kinetics while reducing the amount of byproducts in the final thiosulfate product.

In a preferred embodiment, the mole ratio of sulfur to potassium hydroxide to water is at least about 1 mole S to about 1 mole KOH to at most about 2.5 moles of water.

In another preferred embodiment, the mole ratio of sulfur to potassium hydroxide to water is about 1:1:1.2 to about 1.05:1:2.

In a preferred embodiment, the sulfur to potassium hydroxide to water ratio used is about 1.05 to about 1 to about 1.5. In this embodiment, the reaction can take about 60-70 minutes to complete. The resultant reaction mixture is a solution, which can still be easily handled as fluid.

The purity of caustic KOH can be improved to optimize the quality of the final potassium thiosulfate product. The inventors determined, as will be further described in the section on oxidation, that the use of higher purity KOH resulted in the formation of colorless potassium thiosulfate product with minimum or no dissolved impurities such as polythionates and solid impurities such as potassium sulfite and potassium sulfate. Preferably, the source of KOH used has a low amount of trace metals that have a much lower solubility than potassium with thiosulfate, such as Fe, Ba, Al, Zn, Cu, Ca, and Mg to be about 0.01% or lower. Preferably, KOH in dry or solid form is about 85% to about 99% pure, more preferably about 90-99% pure and even more preferably about 96-99% pure. The dry or solid KOH may be in any suitable form, such as beads, flakes or pellets and is combined with water to form a potassium hydroxide solution. The KOH is dissolved in water. A preferred concentration of KOH in liquid form is about 40 wt % or more to avoid the need for evaporation of the final product. An even more preferred range is between 45 and 55 wt %, such as for example about 50 wt %. In case more diluted solutions of potassium thiosulfate are envisioned, a lower concentration KOH is acceptable, but, preferably, the concentration is about 20 wt % KOH in water or more, more preferably about 30 wt % KOH or more, and even more preferably (as explained above) about 40 wt % KOH or more.

Concentration and purity of different KOH sources were tested. Results are shown in Table 2:

TABLE 2

Characterization of KOH Raw Materials

| KOH Raw Material | % K (mean of 4 different analyses) | % KOH (mean) by K |
|---|---|---|
| Source 1 | 30.7775 | 44.16689322 |
| Source 2 | 34.0175 | 48.81641752 |
| Source 3 | 32.79 | 47.05490793 |
| Source 4 | 36.695 | 52.65873274 |
| Source 5 | 32.7225 | 46.95804284 |
| Source 6 | 33.695 | 48.35361765 |
| Source 7 | 33.1425 | 47.56075895 |

As is clear from the table, the concentration of K ion was found to be different and varied from about 44 to about 53 wt %. The preferred KOH raw material was found to be those with low amounts of trace metals and close to about 50 wt % in KOH concentration, e.g. between about 48-52 wt % KOH, as derived from the amount of K in a 50 wt % solution. Increased purity appeared to have a positive effect in the oxidation step as described below.

Figure 2:
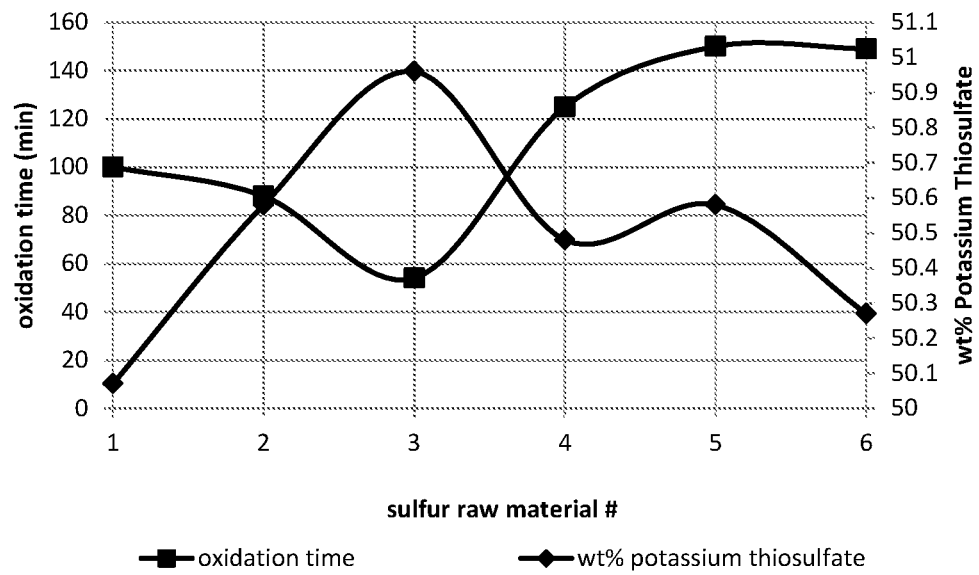
FIG. 2 is a graph titled "Potassium Thiosulfate Using Varied Sulfur Raw Material for Oxidation Time and Potassium Thiosulfate Assay" illustrating the oxidation time variability depending on the sulfur source.

The effect of different sulfur raw materials such as hardened molten sulfur, sublimed sulfur, and molten sulfur prilled in water was evaluated. The effect of different sulfur raw materials on the reaction time of the oxidation, which is described below in more detail, and potassium thiosulfate concentration is shown in FIG. 2. The preferred sulfur raw material was found to have a purity of about 94 wt % or higher, preferably about 96 wt % or higher, while having preferably a low amount of trace metals. The sulfur particle sizes did not appear to have any major effect.

Different types of sulfur can be used such as prilled sulfur, sulfur flakes, molten sulfur, etc. It may be necessary to adapt the feeding system to the type of sulfur used.

Step 4: Oxidation Step

Oxidation of potassium polysulfide to potassium thiosulfate ($K_2S_2O_3$) is achieved by using an oxidizing agent, like for example an oxygen-containing gas. Examples of suitable oxidizing agents include air, oxygen enriched air, and pure oxygen gas (i.e., gas with more than about 90% oxygen). Oxygen enriched air or pure oxygen gas are preferred oxidizing agents. Pure oxygen is most preferred, as the reaction proceeds most economically in view of the shorter amount of time that is required to achieve the desired potassium thiosulfate concentration. However, air is suitable as well, and has lower cost. Preferably, temperature, pressure, oxidation time, and the pH of the starting potassium polysulfide are optimized, as they all play significant roles in the potassium thiosulfate product characteristics.

The theoretical reaction equations for the formation of potassium polysulfide and its subsequent oxidation to potassium thiosulfate are as follow:

$$6KOH+6S \rightarrow 2K_2S_2+K_2S_2O_3+3H_2O \quad (1)$$

$$2K_2S_2+K_2S_2O_3+3H_2O+3O_2 \rightarrow 3K_2S_2O_3+3H_2O \quad (2)$$

In order to monitor the oxidation progress of potassium polysulfide using oxygen-containing gas, an oxidation-reduction potentiometer (ORP) was used. The reaction product was sampled every five minutes for ORP measurement. After 25 minutes, potential increased from −707.4 mv to −581.5 mv. The effect of different mole ratios on the oxidation time was studied. It appears that the increased concentration of S raw material decreased the efficacy of the absorption of $O_2$.

The oxidation reaction at ambient temperature and pressure is very slow. Hence, oxidation at elevated temperature is preferred.

The design of the reactors can be optimized to increase the reaction speed and production output. Lab work has been done by the inventors to define the reaction kinetics of the oxidation reaction. The following parameters have been investigated by the inventors:

1. Raw material quality influences capacity and by-product formation, and is preferably optimized to increase production capacity and to minimize soluble or solid byproducts. For example, increased oxygen concentration will speed up the reaction kinetics and high purity KOH (as described above) will minimize byproducts which can have negative impact on product quality and shelf life.
2. Preferably, sufficient reaction time is provided to obtain a final product that is almost completely oxidized at the envisioned production rates and while being based upon the preferred operating conditions.
3. Mixing is important in creating an improved contact between the oxygen introduced and the liquid in the reactor. For this purpose, it is preferred to use high efficiency mixers to optimize mixing and for the efficient liquid/gas contact.
4. Operating temperature can be increased to speed up the chemical reaction and minimize the reaction time. On the other hand, one has to be careful increasing the reaction temperature, as potassium thiosulfate has thermal stability limitations. The product will degrade at higher temperatures and as a result polythionates and sulfates will be formed. As explained above, certain temperature ranges are preferred, and it is preferred to have a reactor which can be heated and cooled, to achieve desired reaction temperatures. Operating pressure preferably is increased to maximize the contact between the oxygen and the potassium polysulfide solution.

The oxygen used for the purpose of oxidizing can be supplied by atmospheric air or by an enriched oxygen supply source. It is delivered to the reactor at the desired pressure and volume required to support the oxidation reaction. The primary factors that determine the rate of oxidation and the time to complete the oxidation reaction are oxygen concentration, potassium polysulfide contact area with the oxygen, rate of agitation, reaction pressure and reaction temperature. The objective is to complete the reaction in a reasonable amount of time consistent with production requirements and to avoid prolonged reaction times that can lead to increased amounts of decomposition products and oxidation to form potassium sulfate. While atmospheric air is an option, an enriched oxygen supply is preferred. An optimized balance of all of the above variables is preferred as to optimize efficiency without over-oxidizing past the reaction end point or reaching a condition where the product will begin to decompose. In choosing the reaction conditions, it is preferred to monitor byproducts, including polythionates, which could lead to an unstable final product.

Oxygen supplied by air at atmospheric pressure is low in concentration, resulting in longer reaction times which are less suited for industrial production. The availability of oxygen for the reaction can be increased by compressing the air to higher pressures. Increasing the air pressure to about five atmospheres or about 414 kPa (60 psig) increases the available oxygen for the reaction to about the same level as utilizing pure oxygen at atmospheric conditions. When air is used, it is preferred to vent or purge the inert gases continuously or periodically. Alternatively, pure oxygen can be used advantageously at lower pressures and with minimized requirement for purging of the inert gases.

Preferably, the reactor is designed to purge the vapor phase in order to prevent build-up of inerts in the vapor space and to reduce foaming. In a preferred embodiment, the reactor is designed to be able to continuously vent to purge the vapor phase, which would in particular be preferable in case of continuous processing.

The effect of temperature, pressure, agitation rate, and oxidation time was individually investigated by the inventors, using the following ranges in this investigation:

The temperature range was between about 70 and about 90° C.

The pressure range was between about 69 and about 551 kPa (about 0.7-5.5 bar; about 10 and 80 psi).

The agitation rate was between about 400 and about 1000 rpm.

The reasonable reaction time was from about 55 minutes to about 270 minutes.

Each oxidation reaction was observed in its entirety to assess reaction parameters. pH of the final potassium thiosulfate reaction was used to evaluate the effect of these parameters. Reaction product was sampled just prior to completion, at completion, and every 15 minutes after completion, for 1 hour to assess the potential risk over over-oxidation and instability. The potassium thiosulfate samples were allowed to cool to room temperature and then pH was measured.

Figure 3:
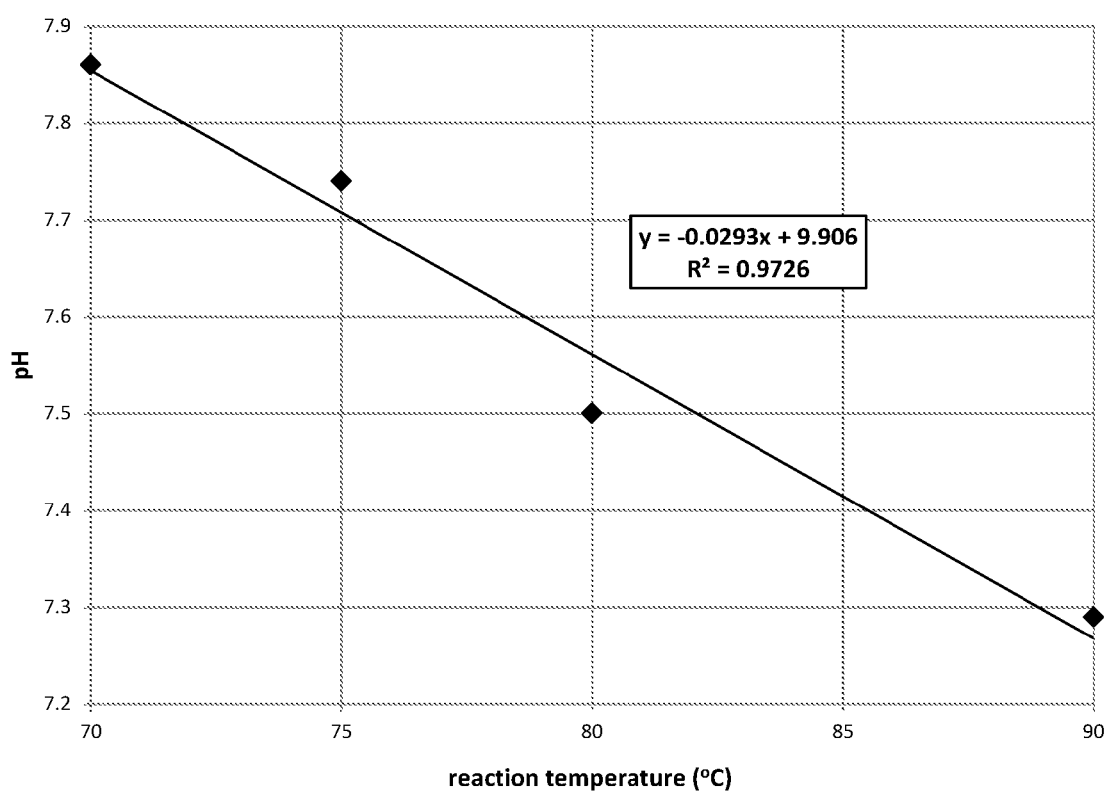
FIG. 3 titled "Oxidation of Potassium Polysulfide Reaction Temperature vs. pH at Completion" and FIG. 4 titled "Oxidation of Potassium Polysulfide Reaction Temperature vs. Reaction Time" are graphs illustrating pH and reaction time dependence on reaction temperature.
Figure 4:
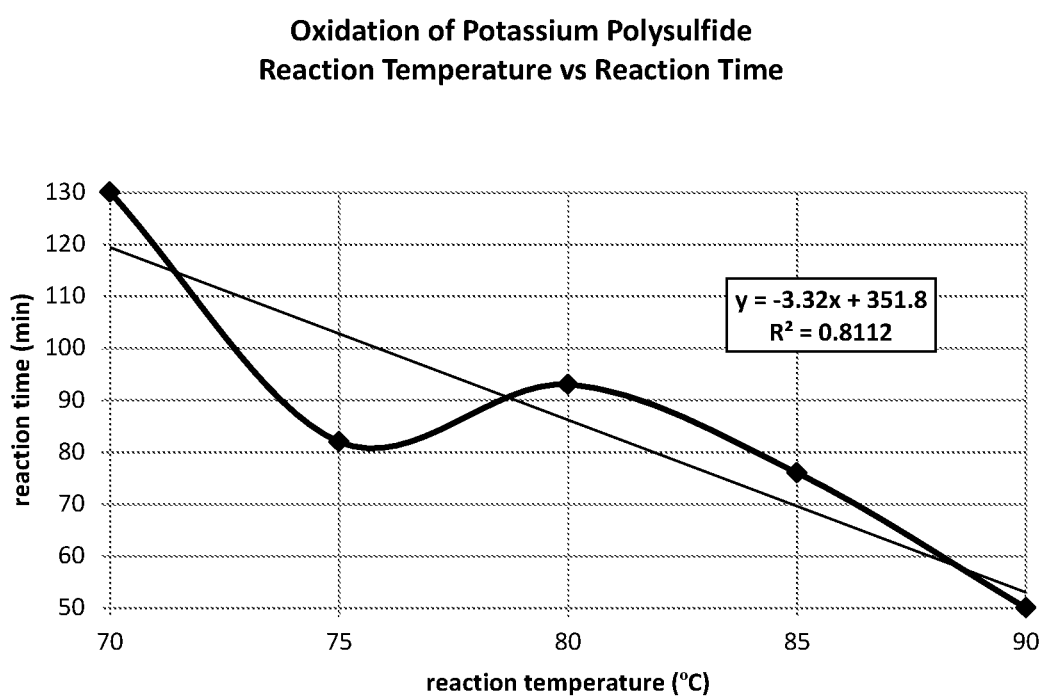

As the stability is important, pH was re-measured after 10 days and 17 days for the reactions conducted at 80° C. and 85° C. The pH was re-measured after 6 days for the reactions conducted at 75° C. and 90° C. and after 5 days for the reaction conducted at 70° C. This data is noted in FIGS. 3 and 4. The measurements indicate that when oxidation is conducted at 90° C., reaction is significantly faster than at other temperatures, and that when oxidation is conducted at 70° C., reaction is significantly slower than at other temperatures. However, the data obtained suggest that reaction time for reactions conducted at 75-85° C. are not significantly different.

Figure 5:
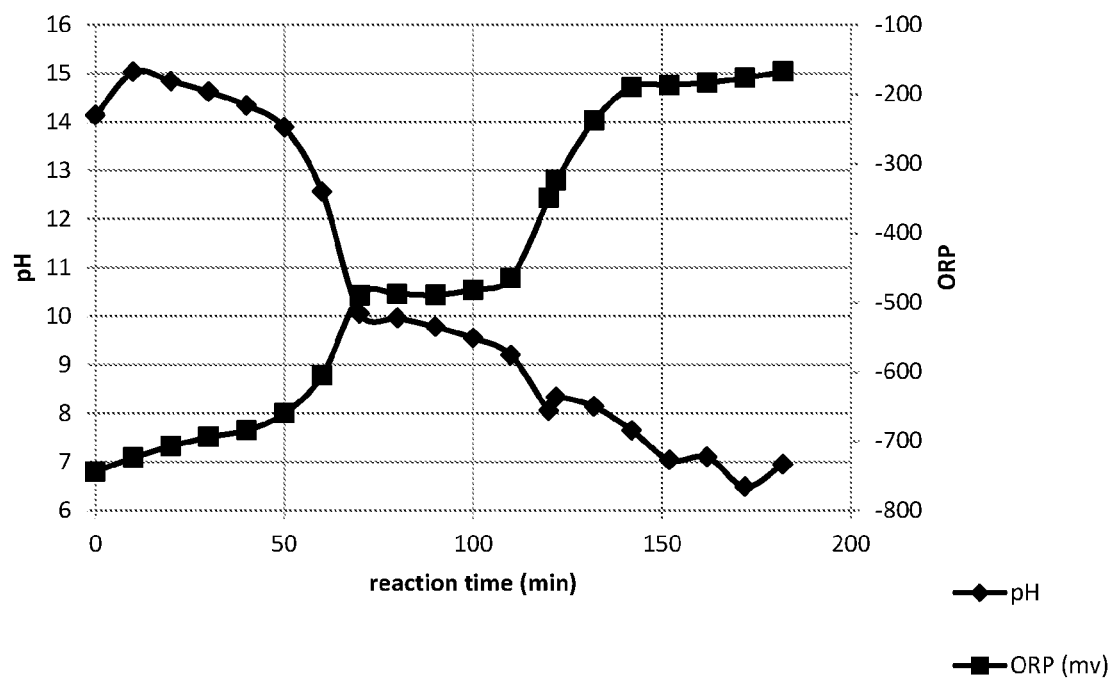
FIG. 5 is a graph titled "Potassium Thiosulfate Reaction, Time vs. pH/ORP S:K 1.05:1.00, Oxidation Temp.=90° C." illustrating the pH and ORP dependence on reaction time.

For the reaction at 90° C., ORP was used in addition to pH measurement. pH is inversely proportional to ORP. The pressure was kept at 276 kPa (40 psi) and the agitation was at 1000 RPM. Data is shown in FIG. 5. The equivalence point, interpreted as the point of conclusion of oxidation, would be predicted to be at 126 minutes. Reaction completion, by negative lead acetate reaction for hydrogen sulfide presence was at 122 minutes. Once the reaction was completed, ORP leveled out.

As the ORP measurements appeared very suitable to measure the reaction kinetics, the present invention also relates to the determination of the end of the oxidation by ORP. The use of the ORP measurement is in particular suitable to be a measurement method for minimizing the over oxidation and formation of sulfates and polythionates in a process for the manufacture of potassium thiosulfate. Hence, the process of the present invention involves monitoring the endpoint of the oxidation using ORP measurement.

Figure 6:
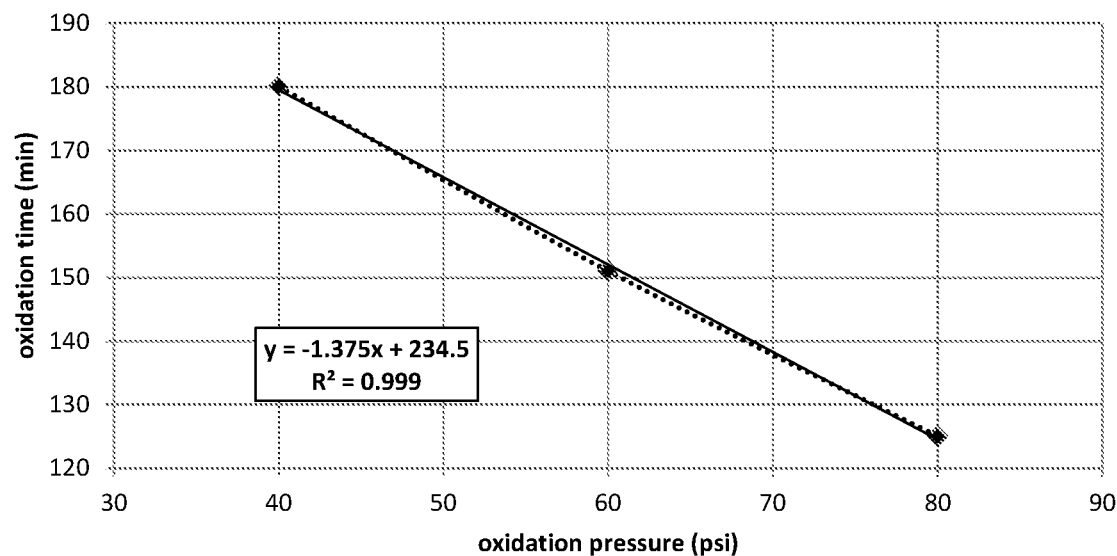
FIG. 6 is a graph titled "Oxidation of Potassium Polysulfide to Potassium Thiosulfate at 90° C. Oxidation Pressure vs. Oxidation Time" illustrating the dependence of oxidation time on oxidation pressure.

A series of reactions were conducted where all parameters were held constant with the exception of the pressure of $O_2$. Pressure was varied from 138-552 kPa (20-80 psi). Oxidation pressure versus oxidation time is charted in FIG. 6, which shows that increasing pressure reduced the oxidation time. The experiments with extended oxidation showed that the oxidation was slower for the reaction conducted at 138 kPa (20 psi). Reaction rate was not significantly different at pressure 276-552 kPa (40-80 psi).

Figure 7:
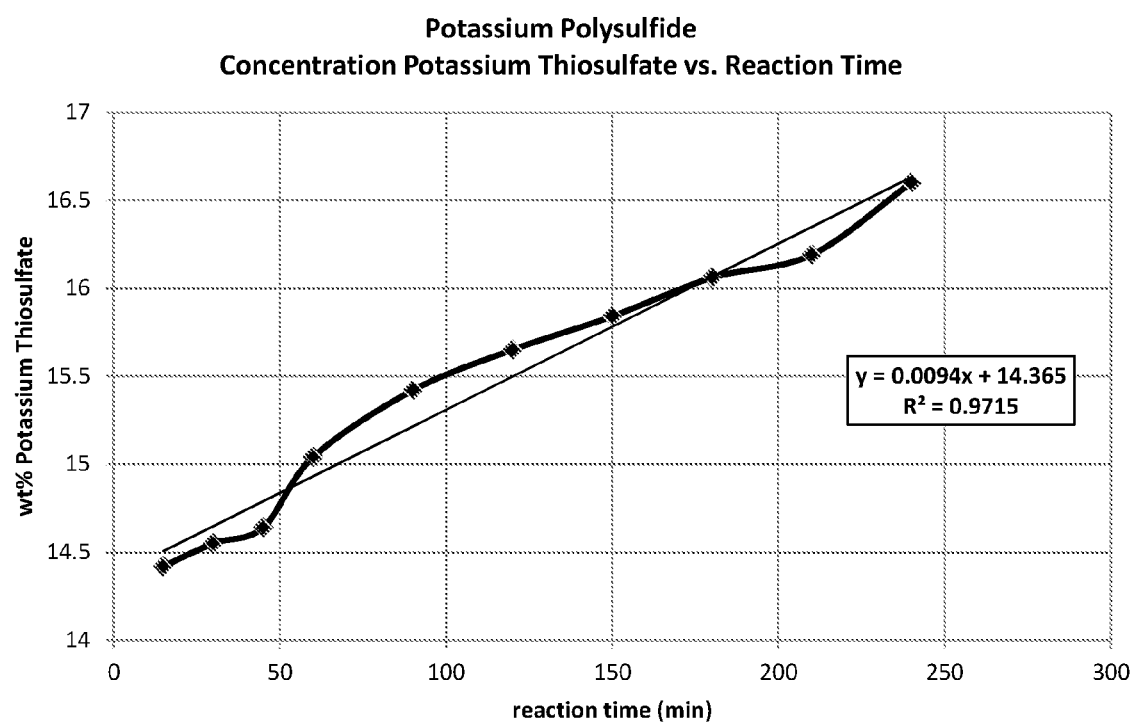
FIG. 7 is a graph titled "Potassium Polysulfide Concentration Potassium Thiosulfate vs. Reaction Time" illustrating the concentration of potassium thiosulfate relative to the reaction time.

Effect of reaction time of potassium polysulfide oxidation was studied. A potassium polysulfide reaction was conducted for 4 hours. During the potassium polysulfide reaction, already some potassium thiosulfate is produced. The objective of the investigation was to determine the effects of potassium polysulfide reaction time on the stability of the potassium thiosulfate material in the potassium polysulfide intermediate. Reaction was conducted at 90° C. with the stirring rate of 850 rpm. The potassium polysulfide was sampled every 15 minutes for the first hour and then every 30 minutes for the next 3 hours. Each sample was measured for thiosulfate ($S_2O_3^-$) concentration by Ion Chromatograph (IC) and pH. After 4 hours, the potassium polysulfide product was oxidized to potassium thiosulfate at 90° C., 276 kPa (40 psi) $O_2$ pressure with the stirring rate of 1000 rpm and S:K=1.05:1.00. The data for reaction time versus wt % potassium thiosulfate is charted in FIG. 7. The data indicate that potassium thiosulfate is stable at 90° C. in the potassium polysulfide solution (without oxidative influence, in the presence of excess KOH and polysulfide), and its concentration increases over time. The reactor was sealed, so evaporation should not be a factor. These data support the stability of the potassium thiosulfate during potassium polysulfide processing over an extended reaction time, meaning that in this respect, the reaction time is not critical, and can be chosen as suitable.

The impact of different oxidation temperatures (90, 100, 110 and 120° C.) on the oxidation times and the oxygen flow rate during oxidation of potassium polysulfide to potassium thiosulfate was also determined. It appeared that the higher the temperature of oxidation, the faster the reaction, and the sharper the drop of flow rate near reaction completion. The sharp drop in flow rate should be an indicator of reduced oxidation activity. From these experiments it appears that temperatures up to about 110 or about 120° C. can be used. However, in case potassium thiosulfate is aimed for with small amounts of impurities, it is preferred to perform the reaction at about 110° C., more preferably about 100° C. or lower and even more preferable, about 90° C. or lower. Generally, the oxidation reaction is performed at a temperature of about 60° C. or higher, preferably at about 65° C. or higher. The reaction is at least for a substantial part of the reaction period preferably performed at a temperature of about 75° C. or higher, as explained above. Even more preferably, the reaction is performed at least for a substantial part of the reaction period, at about 80° C. or higher.

The oxidation rate relative to the rate of agitation was also studied. All raw materials, mole ratio, temperature, and pressure were kept constant. Potassium polysulfide was prepared and subjected to oxidation at 40 psi using agitation rate (±10 rpm) of 400, 600, 800, and 1000 rpm. Completion of the reaction was defined as when the reaction mixture showed negative with lead acetate test paper. Results are shown in Table 3.

TABLE 3

Reaction time vs. Agitation Rate

| Rate of Agitation (rpm) | Time for Oxidation (hrs) | Average Rate of Oxidation (gm potassium thiosulfate/min) |
|---|---|---|
| 400 | 10.50 | 0.67 |
| 600 | 2.95 | 2.39 |
| 800 | 1.78 | 3.92 |
| 1000 | 0.92 | 7.62 |

These data show that the faster the agitation rate is, the shorter is the reaction time, although at rates above 600 rpm, the influence was rather small. Hence, proper mixing of the gas-liquid should be considered.

Because the proper mixing is important, it is preferred that the process is carried out in suitable equipment. Hence, the process is preferably carried out in gas/liquid contacting process equipment selected from the group consisting of bubble columns, packed columns, tray columns, spray columns, mechanically agitated tanks, jet loops, pipes/tubes, agitators, in-line high shear and high impact mixing equipment, and cavitational reactor technology. In a preferred embodiment, the oxidation is conducted using in-line mixing equipment and/or cavitational reactor technology at oxygen pressures up to about 20 MPa (3,000 psig).

Preferably, the process for preparing potassium thiosulfate of the invention for use as fertilizer comprises the following steps:

a. providing a potassium polysulfide solution;

b. adding an oxidizing agent, preferably oxygen, to the solution and reacting the solution under conditions suitable to form potassium thiosulfate;

c. using a batch process, or using continuous stirred tank reactors comprising of at least two continuous stirred tank reactors, to complete the oxidation;

d. using the appropriate conditions and setups for production of high purity and high concentration potassium thiosulfate solution suitable as fertilizer; and e. recovering the potassium thiosulfate in a batch manner or continuously.

In a preferred process for preparing a high strength potassium thiosulfate the need for concentration of the final potassium thiosulfate solution can be avoided by using sufficiently highly concentrated potassium hydroxide solution. In this way, the process of the invention has a significant cost benefit compared to other processes; especially for investment, operating and maintenance costs for one or more of the following items: (a) cooling water systems, (b) steam boiler and condensate systems and/or (c) pumps and piping systems.

B. Continuous Potassium Thiosulfate Production in CSTRs.

The information and teachings as explained above for batch processing are for a substantial part also applicable to continuous processing. Hence, preferred ranges and/or equipment explained for batch processing are also applicable to continuous processing, unless otherwise stated.

Potassium thiosulfate can be produced utilizing CSTR reactors and in accordance with reaction conditions specifically established for the process. In the potassium thiosulfate production process, CSTRs with a shorter residence time than originally predicted by the models were created based on lab scale batch tests and full scale batch production. However, this is dependent on several design parameters. Both pilot and lab scale testing show that potassium thiosulfate production rates can be improved by using higher pressure.

The tests conducted in the lab demonstrated certain relationships between pressure, temperature, residence time, and product stability. The relation between pressure and batch time was found to be largely linear at pressures from about 276 to about 552 kPa (about 40 to about 80 psi). Above about 552 kPa (about 80 psi), the increased pressure seems to have little positive influence on the reaction rate. Hence, preferably the pressure is about 689 kPa (about 100 psi) or less, preferably about 552 kPa (about 80 psi) or less. Very high pressures can be used, but are less preferred because of relatively high investments. Between about 276 and about 552 kPa (about 40 and 80 psi), there is an inverse linear relation between oxidation pressure and batch time. The pressure also has an influence on the stability of the product, which can be determined by a drop in pH over time. At higher pressures it is preferred to use an optimized profile of operating conditions to improve the stability of the product.

Pilot scale testing showed the product remained more stable and completion of oxidation was faster than anticipated based on laboratory tests. In a preferred embodiment of the process of the invention, one optimizes the reactor and impeller design and processing for optimal transfer of oxygen at the gas/liquid boundary. The potassium thiosulfate product assay that was predicted by the model was actually closer to the assay after the first CSTR rather than after the third. Operationally, the pilot test showed that product stability and completion are easily controlled by changing pressure and temperature in the various CSTRs.

Hence, it is preferred to have a continuous process performed in one potassium polysulfide CSTR reactor, and subsequently two CSTRs for oxidation with appropriate appendages.

The feasibility of producing potassium thiosulfate using continuous stirred tank reactors (CSTRs) by oxidation of potassium polysulfide utilizing oxygen was studied in detail. The primary issue with producing potassium thiosulfate by oxidizing potassium polysulfide is product pH stability.

For potassium thiosulfate production, potassium polysulfide is made first; raw materials are placed in the reactor continuously. At this point the reactor is heated for the designated amount of time at the specified temperature. Oxidation begins by setting the pressure at the oxygen cylinder then opening the valve to the reactor. Oxygen is fed below the liquid surface. Samples are taken from a valve on the oxygen line; liquid back feeds to the sample outlet.

Pilot testing utilizing a series of CSTRs was carried out. The pilot lab utilized has one reactor for the potassium polysulfide reaction and three smaller reactors following it which are capable of being pressurized, and can be used for the oxidation reaction. The potassium polysulfide reactor has a full jacket with steam connected in order to maintain the desired reaction temperature. The oxidation reactors have jackets around the body with cooling and/or warm water available. Liquid feed is measured by totalizing the product and controlled by the feed pump speed. Total oxygen flow is recorded with a mass flow meter, and individual rotameters to the reactors are in place for reference. Also recorded are temperature and pressure at each of the reactors.

An important consideration in maintaining good oxidation rate is to provide efficient gas/liquid contacting that provides adequate contact area and contact time for the oxygen carrying gas and the liquid potassium polysulfide to react. Contacting is important because the reaction primarily takes place at the oxygen gas-liquid interface. If this interface area is not adequate, the reaction will be slow. Further, a slow reaction may lead to a larger amount of undesirable byproducts. The potassium thiosulfate oxidation rate in CSTR appears to be mass transfer limited rather than kinetically limited.

To provide sufficient residence time for the oxidation reaction, it is common to use a series of CSTRs, for example 3, 4 or 5. The number of CSTRs is based on a simulation of the residence time in the system. Utilizing a series of CSTRs keeps the product longer in the system than it would be in one reactor and it allows gradual build-up of concentrations.

Test runs were used to calibrate the agitator speed and find the oxidation batch time for modeling purposes. An agitator speed was found that completed a batch in an optimized time, while lower speeds would not incorporate the oxygen into the liquid adequately which would increase the required batch time.

To ensure tests were run for the appropriate length of time, the process was monitored and sampled closely for the first 10 hours. At this point the continuous reaction was determined to be at steady state and it appeared that the output in the second and third CSTR were about the same. This clearly allowed the conclusion that 2 CSTRs should be sufficient to have full conversion. Yet, in another set up, it may be preferable to have 3 or 4 CSTRs in series. At least one additional CSTR or an additional batch reactor can be used as an aging vessel, which at a lower temperature ascertains complete reaction while lowering the risk of side reactions.

A test was done at a pressure of about 300 kPa (3 Bar; 43.5 psi) and a flow of about 60-65 kg/hr of potassium thiosulfate product, which allowed for 3 hours of average residence time. The product was very close to completion after the second stage CSTR.

Based on data collected it appears only two CSTRs (based on design models and pilot scale mixing configuration) would be required with a finishing step to ensure the product is fully oxidized; although this is dependent on the linearity of a scale up. Using only 2 CSTRs presents a significant cost savings compared to a design with three CSTRs.

It also appears possible to produce a potassium thiosulfate product in a continuous process which is at least as stable as the potassium thiosulfate produced with optimized batchwise oxidation. This finding on stability is somewhat unexpected, because in a CSTR process, some of the product charged to the system has a short residence time to be oxidized, while another fraction of the product can stay in the system for a very long time. Both incomplete oxidation and over oxidation could have a detrimental effect on the final product.

In case it appears that some fraction of the product may not have been oxidized completely as it did not have sufficient residence time in the reactor, a finishing step may be preferred to fully complete the reaction to about 100% oxidation. However, testing with two CSTRs showed that about 100% oxidation of potassium polysulfide to potassium thiosulfate could be achieved in the CSTR oxidation reactors, and a finishing step was not necessary.

In both the batch and the continuous process, side streams or waste streams will be recycled in part or in whole. Preferably, contaminants are removed at least in part from waste streams before recycling. In particular, liquid waste streams are recycled to a suitable place in one of the reactors. Condensable compounds in gas streams may be separated from inert gaseous constituents of the gas stream, and such compounds can be recycled as far as suitable.

As the mixing is important, the present invention also relates to a contactor/reactor apparatus for reacting potassium polysulfide and oxygen to prepare potassium thiosulfate solution using at least one batch or CSTR reactor, the apparatus comprising of:

a. Mixing equipment aimed to optimize contact with oxygen in the oxidizing agent and optimize residence time in the reactors;

b. Reactor design with temperature and pressure ratings allowing for production at the optimum operating conditions;

c. An oxidizing agent/oxygen supply and venting systems aimed to minimize foaming and allowing suitable venting requirements;

d. A design to adjust the number of reactors and size, substantially optimizing the overall residence time in the system; and e. A positioning of piping combined with a design of a reactor agitator to optimize the residence time in the reactor compared to the theoretical mean residence time.

Preferably, the contactor/reactor apparatus is equipped with heating and cooling means.

Hence, mixing efficiency preferably is maximized to increase the contact between the oxygen introduced and the liquid in the reactor.

From a commercial perspective, it is preferred to optimize the reactor design to minimize reaction times for a batch process or improve residence times and reaction efficiencies in a continuous process.

spray drying or freeze drying to provide solid potassium thiosulfate. The potassium thiosulfate preferably is used in liquid form. The pH of the potassium thiosulfate may initially be at a pH of 10 or lower, but may decrease in the first days in storage. The concentrated potassium thiosulfate may have a pH about 9 or lower (which preferably is measured after about 2 weeks in storage); however, when diluted for foliar spray, the pH will be substantially lower, being less than about 8, as the foliar spray will be thinned at least 10 fold.

The potassium thiosulfate having a preferred pH of about 8 or lower is also very suitable to be mixed with other fertilizers, micronutrients, plant regulators or other compounds that are sprayed onto plants and crops.

EXAMPLES

Referring to the potassium thiosulfate production processes as described above; the following are exemplary embodiments according to the invention:

Example 1: Potassium Polysulfide from 50% KOH Solution 414 grams of water is placed in an agitated reactor fitted with a thermometer, heating and cooling devices, pressure gauge and 305.1 grams of 90% KOH is added followed by addition of 179.1 grams of sulfur. The exothermic mixture is agitated for 40-60 minutes for complete reaction. The progress of reaction was followed by titrimetric consumption of iodine by sodium thiosulfate titration. Results for slow addition of sulfur are shown in Table 4:

TABLE 4

Potassium Polysulfide Reaction with Slow Addition of S

| min | total gm S | ml $I_2$/gm potassium polysulfide | mole S | S:K | gm sample | ml $I_2$ | ml sodium thiosulfate | ml $I_2$ Consumed | gm S added |
|---|---|---|---|---|---|---|---|---|---|
| 0 | 21.00 | | 0.655 | 0.134 | | | | | 21.00 |
| 11 | 58.40 | | 1.82 | 0.37 | | | | | 37.40 |
| 21 | 78.20 | 46.83 | 2.44 | 0.50 | 0.39 | 20.3 | 2.07 | 18.26 | 19.80 |
| 30 | 101.60 | 44.84 | 3.17 | 0.65 | 0.66 | 40.7 | 11.07 | 29.60 | 23.40 |
| 42 | 123.60 | 46.98 | 3.86 | 0.79 | 0.57 | 40.7 | 13.88 | 26.78 | 22.00 |
| 53 | 163.50 | 46.13 | 5.10 | 1.04 | 0.51 | 40.7 | 17.14 | 23.52 | 39.90 |
| 64 | 179.10 | 43.03 | 5.59 | 1.14 | 0.31 | 20.3 | 6.99 | 13.34 | 15.60 |
| 119 | 179.10 | 41.02 | 5.59 | 1.14 | 0.32 | 20.3 | 7.21 | 13.13 | 0.00 |

Figure 8:
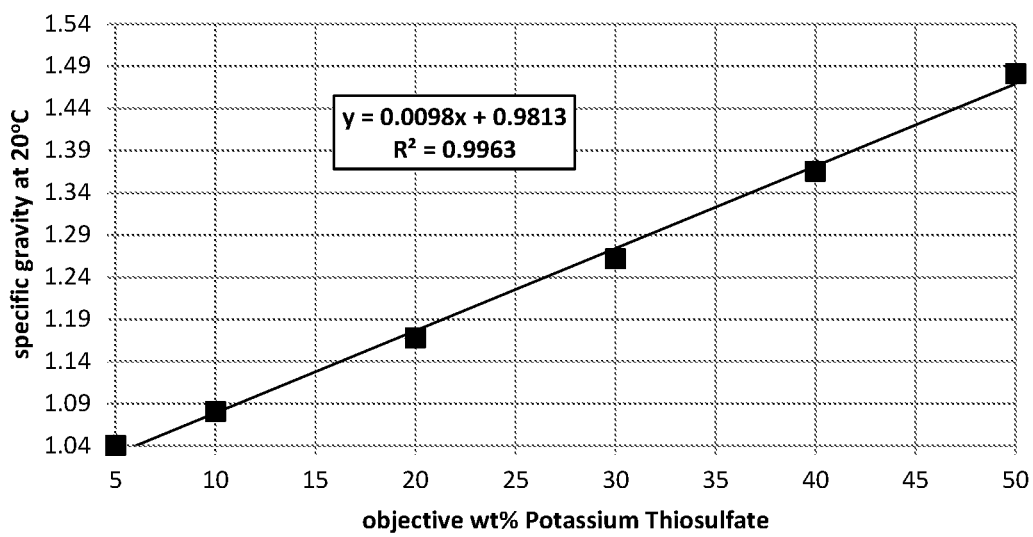
FIG. 8 is a graph titled "Synthesis of Potassium Thiosulfate Concentration vs. Specific Gravity at 20° C." illustrating the concentration of potassium thiosulfate relative to the specific gravity and wt % potassium thiosulfate.

Characteristics of potassium thiosulfate were studied to develop a determination of concentration based on Specific Gravity. The results are shown in FIG. 8.

With the process of the present invention it is possible to produce potassium thiosulfate with a minimum level of solid byproducts. If it is to be used as a liquid fertilizer, preferably no solids are present. Hence, the amount of potassium sulfate in the mixture preferably is about 0.4% by weight or lower, preferably about 0.3% by weight or lower. The potassium thiosulfate may be filtered to remove solids. With the process of the present invention it is possible to produce potassium thiosulfate with no or very low levels of polythionates which are soluble oxidation byproducts. The amount preferably is about 100 ppm or less, even more preferably about 10 ppm or lower.

The potassium thiosulfate product produced according to the invention is a high purity, high concentration, up to about 55% solution. It can be dried by conventional means such as Example 2: Potassium Polysulfide from KOH Pellets A potassium polysulfide solution was prepared by adding 262.1 grams of KOH pellets with 90% purity, 362.2 grams of water, and 135.18 grams of sulfur. Sulfur was added slowly and the temperature of the reaction was kept around about 90-92° C. After all the sulfur was added, the deep red solution was stirred at this temperature for an additional 20-30 minutes.

Example 3: Potassium Thiosulfate Preparation-Batch Operation

The above potassium polysulfide is in an agitated reactor, capable of being pressurized to about 4-8 atmosphere and is purged prior to introducing oxygen. The polysulfide solution is agitated moderately to provide an even interface of liquid-gas and with no vortex formation. The air is purged out of the system. Oxidation by oxygen starts by introducing the oxygen to the system and maintaining the pressure of the system to 276-414 kPa (40-60 psig). The reactor temperature is maintained at about 90-92° C. The oxidation is continued until no more oxygen is absorbed, which is apparent by no more pressure drop or heat rise.

Example 4: Potassium Thiosulfate Continuous Process Laboratory Example

The objective of this procedure was to demonstrate the feasibility of producing potassium thiosulfate by a continuous process. Feasibility was defined by the stability of potassium thiosulfate assay and by the minimal amount of sulfate or polythionates in the finished product. The process was meant to simulate a potassium thiosulfate CSTR process. The intention of this experiment was to simulate the continuous oxidation without fully oxidizing the product. A subsequent CSTR can be used as a vessel for finishing the reaction. One (1) liter of potassium polysulfide was synthesized. Half of the synthesized potassium polysulfide solution was returned to the reactor and oxidation was commenced on this portion. Near the end of oxidation, 50 ml of the reactor contents were drawn and replaced with 50 ml of the retained potassium polysulfide. Each collected sample—the intention was for the intermediate samples to be near completion, but not totally processed—was evaluated for $S_2O_3^-$ by IC and iodine titration, visible color and pH. Data is shown in Table 5.

TABLE 5

Evaluation potassium thiosulfate production by CSTR

| Sample # | Color | pH | Wt % $K_2S_2O_3$ | Iodine consumed ml/gm |
|---|---|---|---|---|
| 1 | Deep Red | 14 | 16.31 | 45.39 |
| 2 | Red | 12.28 | 26.44 | 41.38 |
| 3 | Light Red | 10.51 | 38.33 | 35.43 |
| 4 | Light Red | 10.21 | 50.10 | 30.59 |
| 5 | Yellow | 10.01 | 52.69 | 28.60 |
| 6 | Yellow | 10 | 53.04 | 26.25 |
| 7 | Yellow | 10 | 52.67 | 25.01 |
| 8 | Light Yellow | 9.92 | 52.53 | 26.21 |
| 9 | Colorless | 8.00 | 53.64 | 25.73 |

Note:
Sample #9 is the finished product. This procedure also confirmed that the potassium thiosulfate product remained stable throughout the process.

What is claimed is:

1. A process for preparing potassium thiosulfate comprising the following steps:
    Step (1): providing a potassium hydroxide solution;
    Step (2): adding sulfur to the solution at a sulfur to potassium hydroxide mole ratio of from about 1:1 to about 6:1;
    Step (3): reacting these to form a reaction mixture comprising potassium polysulfide;
    Step (4): adding an oxidizing agent to the reaction mixture and reacting under conditions suitable to form potassium thiosulfate; and
    Step (5): recovering the potassium thiosulfate.

2. The process according to claim 1, wherein step (2) further comprises adding sulfur at a sulfur to potassium hydroxide mole ratio of from about 4:1 to about 6:1.

3. The process according to claim 1, wherein step (2) further comprises using potassium hydroxide solution with a concentration between about 40 and about 60%.

4. The process according to claim 1, wherein step (3) further comprises reacting the mixture in step (3) at a temperature of least about 70° C.

5. The process according to claim 1, wherein step (1) further comprises a step of forming said potassium hydroxide solution by combining potassium hydroxide and water.

6. The process according to claim 1, wherein the potassium hydroxide is about 90% to about 99% pure.

7. The process according to claim 1, wherein the sulfur is at least about 94% pure.

8. The process according to claim 1, wherein step (4) further comprises reacting at a temperature of about 70° C. to about 110° C.

9. The process according to claim 1, wherein the process is performed in a batch process or as a continuous process in a series of continuous stirred tank reactors (CSTR).

10. The process according to claim 9, wherein step (4) further comprises addition of an oxidizing agent, and applying agitation to complete oxidation of potassium polysulfide in a batch operation or partially oxidize the potassium polysulfide in a first CSTR.

11. The process according to claim 1, wherein the oxidation in step (4) is conducted at a pressure of about 0 to about 689 kPa (100 psig).

12. The process according to claim 1, wherein the oxidation is conducted using in-line mixing equipment and/or cavitational reactor technology at oxygen pressures up to about 21 MPa (3,000 psig), and wherein the oxidation is conducted using a batch process or a combination of continuous stirred tank reactors.

13. The process according to claim 1, wherein the solution prepared in step (4) is monitored for maintaining pH between about 5.0 and about 9.0 in a storage tank equipped with agitation and pH electrode.

14. The process according to claim 1, for preparing potassium thiosulfate solution having a concentration of about 45-56 wt %, by using a potassium hydroxide solution of a concentration of about 45 wt % or more to dissolve sulfur, and further oxidizing the potassium polysulfide solution with an oxygen containing gas to obtain a potassium thiosulfate solution having a concentration of about 45-56 wt %, without a specific concentration step.

15. The process according to claim 1, wherein the potassium thiosulfate has one or more of the following characteristics: (i) a concentration of about 45-56%; (ii) the amount of solids is lower than about 3%; and (iii) the pH measured after 2 weeks storage is between 6.5 and 9.

16. The process according to claim 1, wherein step (2) further comprises adding sulfur at a sulfur to potassium hydroxide mole ratio of from about 2:1 to about 4:1.

17. The process according to claim 1, wherein step (2) further comprises adding sulfur at a sulfur to potassium hydroxide mole ratio of from about 1:1 to about 1.5:1.

18. The process according to claim 1, wherein step (3) further comprises reacting the mixture in step (3) at a temperature of about 85° C. to about 95° C.

19. The process according to claim 1, wherein step (4) further comprises reacting at a temperature of about 80° C. to about 95° C.

20. The process according to claim 11, wherein the oxidation in step (4) is conducted at a pressure of about 69 kPa (10 psig) or higher.

* * * * *

UNITED STATES PATENT AND TRADEMARK OFFICE
CERTIFICATE OF CORRECTION

PATENT NO. : 9,988,270 B2
APPLICATION NO. : 15/380838
DATED : June 5, 2018
INVENTOR(S) : Michael Massoud Hojjatie et al.

It is certified that error appears in the above-identified patent and that said Letters Patent is hereby corrected as shown below:

In the Specification

Column 13, Line 31, the text "$S_2O_3^-$" should be changed to -- $S_2O_3^{2-}$ --

Column 19, Line 29, the text "$S_2O_3^-$" should be changed to -- $S_2O_3^{2-}$ --

Signed and Sealed this
Thirtieth Day of October, 2018

Andrei Iancu
*Director of the United States Patent and Trademark Office*